INVENTOR.
M. LLONGUERAS TORRAS

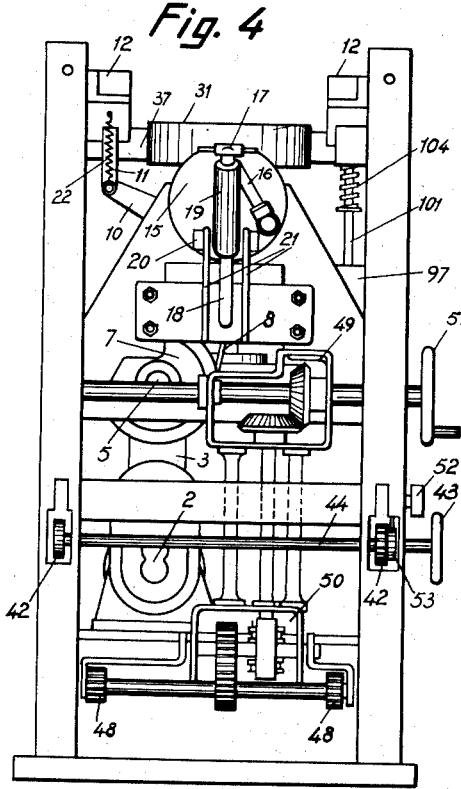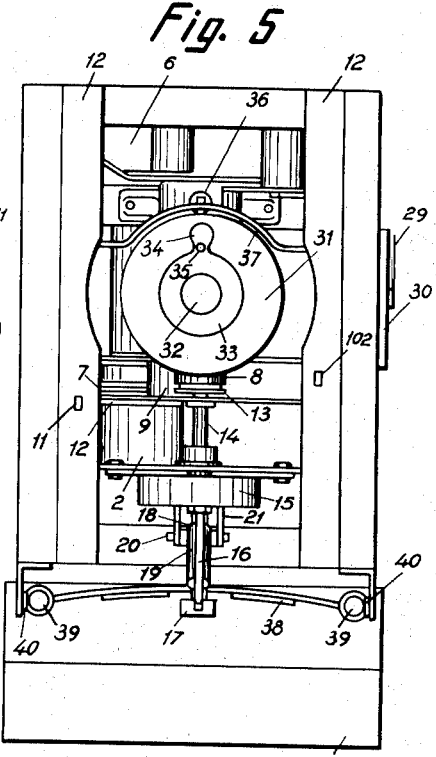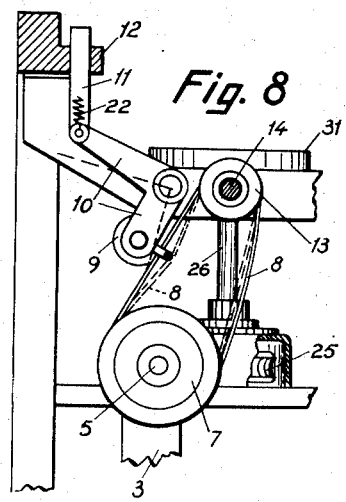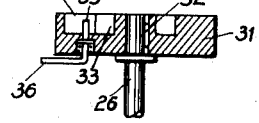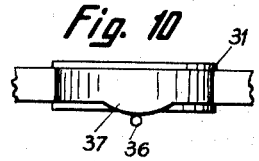

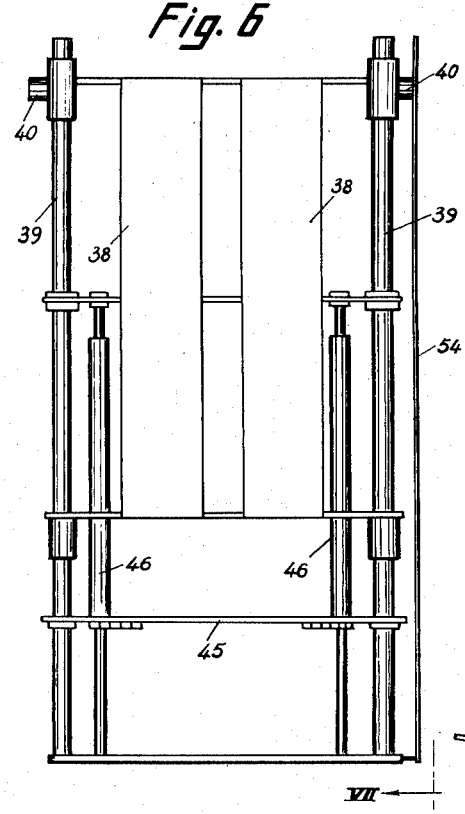
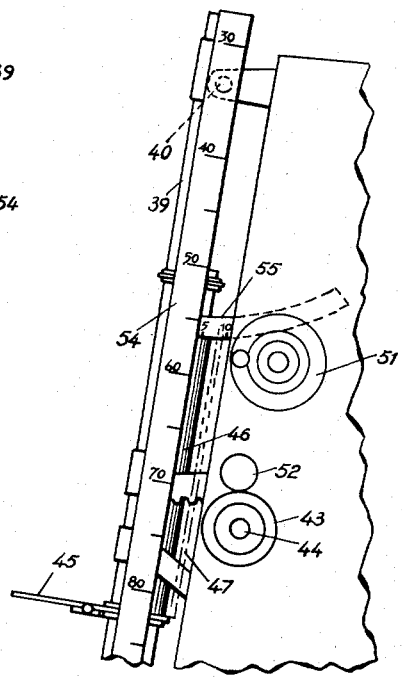
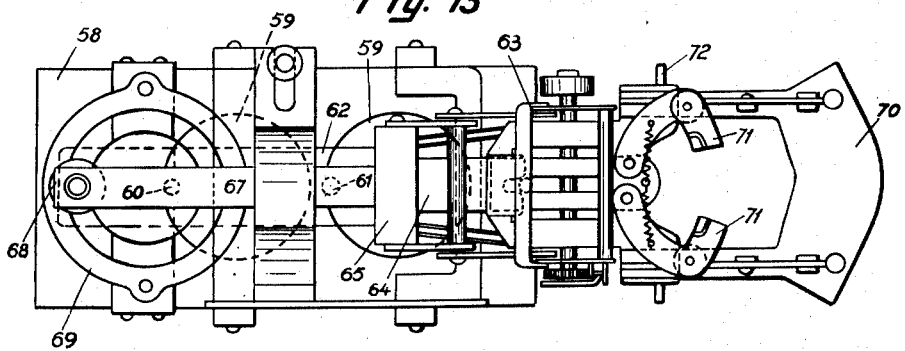

INVENTOR.
M. LLONGUERAS TORRAS
BY Wendwell, Lind & Ponack
ATTORNEYS

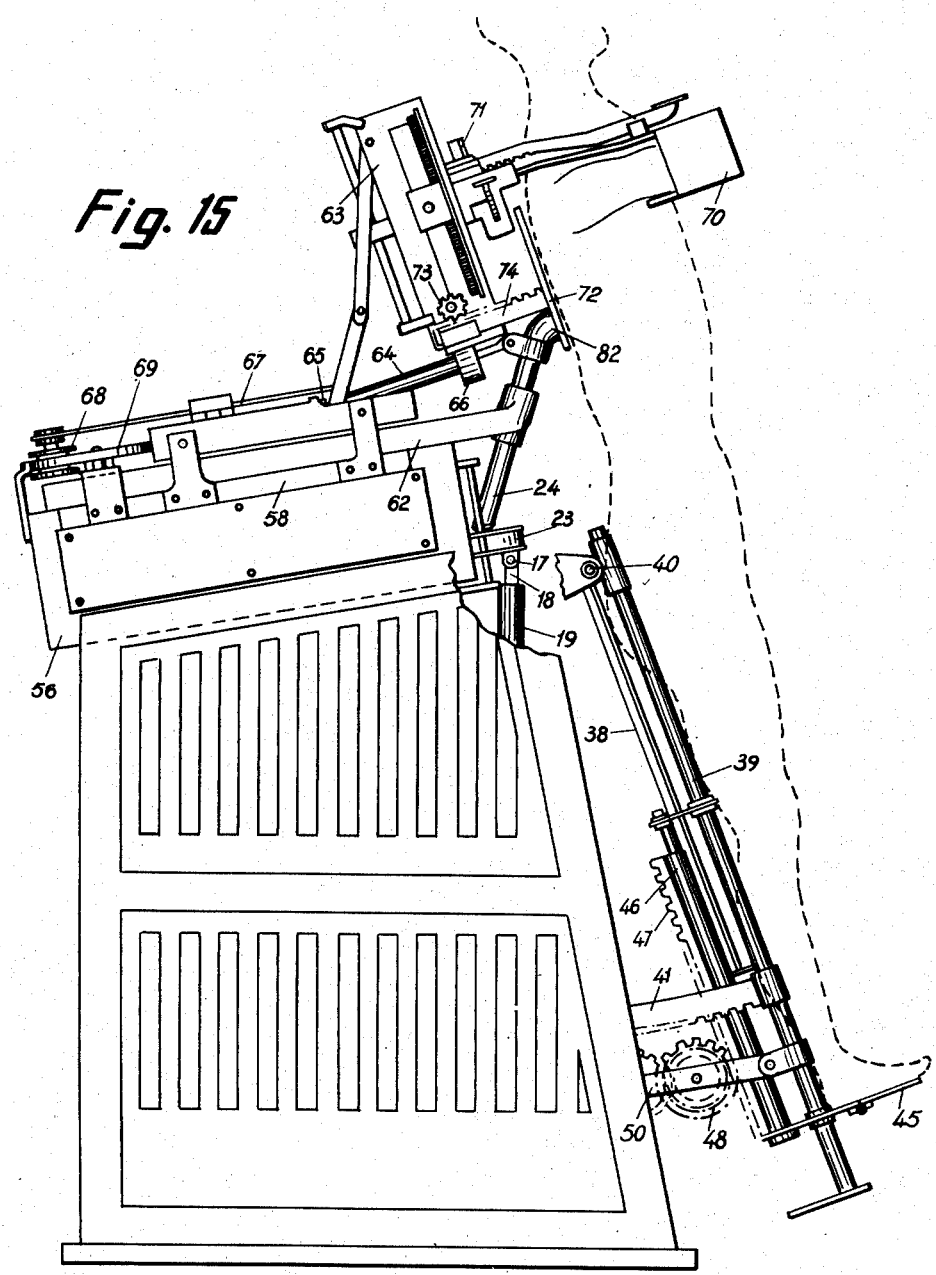

Patented Jan. 12, 1954

2,665,684

UNITED STATES PATENT OFFICE 2,665,684

AUTOMATICALLY WORKING ELECTROMECHANICAL APPARATUS FOR THE REDUCTION OF VERTEBRAL LUXATIONS AND SUBLUXATIONS

Miguel Llongueras Torras, Barcelona, Spain

Application October 11, 1950, Serial No. 189,644

Claims priority, application Spain June 19, 1950

4 Claims. (Cl. 128—69)

The present invention relates to an automatically working electromechanical apparatus for the mechanical movement of the body limbs and joints of the patient.

Recent studies at the universities and colleges in the physical therapy field have indicated that a new orientation to the suitability of physical therapy is necessary in view of the modern techniques available.

Said methods of technique relate to the submission of the patient's body to rotary movements in the direction which the inclination of the deviation requires, and in a vertical, or somewhat inclined position, the body being maintained subject at the height of the arms and in contact with the affected vertebra by means of a luxation reducing appliance, until attaining in the rotation a propitious condition of the vertebral column, adequate to allow, by virtue of a relatively rapid impulsion, to momentarily suspend the body aloft and to place the displaced, or initially displaced vertebra into its normal position.

The application of said therapy must be preceded by a minute radioscopic examination, by means of which have to be clearly defined position and accurate point of the luxation, as well as the direction of the deviation.

With these data it suffices for obtaining, by means of the indicated mechanical effects, the reduction which is desired.

In the practice, however, the obtention of some result has been only rudimentarily arrived at, owing to the lack of an apparatus, especially appropriate to carry through—once prepared according to the data obtained in the radioscopic examination—the operation totally by itself in an automatic and accurate manner.

The apparatus in question, subject-matter of the present patent of invention, solves the problem satisfactorily, since it allows the patient's body to be placed on a vertical support or back, inclinable at will, with the desired precision so that his affected vertebra will come into leaning engagement with a special luxation reducing appliance. It is likewise attained that, starting from this setting initial position in which the patient's body is disposed according as it has been pointed out, said body may be given a movement of conical rotation rotating their shoulders while standing with the feet on said support, in order to prepare the vertebral column, the rotation being in the direction required in accordance with the deviation of the vertebra.

As soon as the body acquires a certain inertia of rotation a propitious retrograde movement is produced which causes a rapid synchronous ascensional movement, viz. a suspensive movement of the body and an impulsive motion in charge of the luxation reducing appliance, resulting that the reaction in virtue of gravity and verticality of the body, will act in aid of the pressure of the luxation reducing appliance upon the deviated vertebra, alining the same in its normal position.

This system avoids possible errors in appreciating the engagement of the vertebrae, as well as the violences or undue pressures of other systems. The present electromechanical system is calculated to be completely innocuous when the vertebral column does not shown any anatomical alteration. It solely exerts reducing effect thereupon when displacement of a vertebra does exist, be the same small or large, that is to say it only corrects what is improperly alined.

The operation is without repetition, viz. it is not insisted once again on this rotation and vertical suspension impulse. The working of the apparatus is performed in accordance with the preparation and radioscopic examination, and in order to repeat the action, it needs to be begun anew, with the new examination required according to the result. Such as the apparatus is conceived, and following therein the new technique of reducing vertebral luxations, the aforementioned correcting impulsion must necessarily conduct to the desired reduction.

The apparatus may be applied to subluxations, that is to say to small and imperceptible initiated defects that only are manifested in the functional alteration of the zones and organs which feed the nerves passing through the vertebra the alignment of which is initially defectuous, thus becoming highly convenient for a multitude of nervous diseases, functional and other alterations which have their main source of origin in the greater or smaller compressions that the nerves undergo in their branching off from the spinal medulla.

The apparatus which will now be described is composed of three elements or parts, the working thereof being mechanically correlated to each other, said parts being united to one and the same bed. The central part is confined to the transmissions which, from the axle of an electromotor and by means of suitable transmission gearings, impart the movement to the upper part, or oscillating or rotary suspension element, said part constituting in itself a special device for the task of suspending the body and of the reducing impulsion on the diseased zone.

The third part is destined for the support of the patient's body on a back arranged in frontal position with respect to the apparatus the frame of which may be adjusted in height and inclination without that these movements affect the transmission movement of the apparatus, for which reason it will be possible to actuate on said back in the moment which may be convenient. The said back carries a plate or footstep as a rest for the feet.

The apparatus is based on the fundamental theory that, on rocking the body in rotation (in the direction the deviation may require), occur small alternate detachments of the angles of the vertebrae at the flexible adhesion planes thereof; in full rotation is caused a slight backward inclining movement of the upper part of the body, in order to prepare a better leverage of the vertebra in the most propitious moment for the normal setting thereof. Then, always simultaneously, is produced a rapid synchronous ascensional movement of the body, for the purpose that the force may be vigorous (weight) and normal (verticality) with the reducing impulsion in contact with the vertebra which, when all preparatory and co-operating movements are being condensed into this point, performs the reduction.

The rotary movement is absolutely necessary for the reduction of the greater part of dorsal vertebrae deviations, however in not a little number of cases, if the deviation is slight, it may be done without the said rotary movement.

For cervical vertebral deviations, instead of fastening the patient's body around the arms, such as require the dorsal and lumbary deviations, is fastened by means of a special device under the face and around the front portion of the neck, and the reducing appliance actuates likewise in contact with the affected cervical vertebra. The automatic mechanical movements utilized for the reduction of the cervical deviations are the same as the ones pointed out above, with the exception of the operating of the rotary movement the use of which will be determined solely and in definite cases by the clinical criterion of the physician.

For a better understanding of the present invention reference is made in further describing same to the accompanying sheets of drawings, illustrating a case of embodiment which is quoted only by way of example.

In the drawings:

Fig. 1 shows in side elevation the mechanisms and transmission gearings lodged in the lower part of the apparatus.

Fig. 2 indicates in rear view the components according to plane II of Fig. 1, of the automatic tension mechanism for the operating of the suspension devices.

Fig. 3 is the view of said automatic tension mechanism according to line III of Fig. 2.

Fig. 4 indicates in frontal view the mechanisms corresponding to the front of the apparatus, according to line IV of Fig. 1, supposing to be withdrawn the covering of the lower element of the apparatus and the sustaining device of the patient's body.

Fig. 5 represents the view on the upper portion of the central part mechanisms of the apparatus, according to line V of Fig. 1.

Fig. 6 indicates the view of the front part of the apparatus, according to plane VI of Fig. 1 which is constituted by a sustaining back of the patient's body, in a lifting and inclinable arrangement.

Fig. 7 illustrates in side view the back of the apparatus, according to line VII of Fig. 6.

Fig. 8 indicates the arrangement of the automatic tension device for the operation of the luxation correcting impeller, according to line VIII of Fig. 1.

Fig. 9 shows in diametrical section the upper ensemble operating plate device of the apparatus for the purposes of suspension and pressure of the correcting appliance.

Fig. 10 represents the side view of the eccentric coupled to the plate indicated in Fig. 8.

Figure 11:
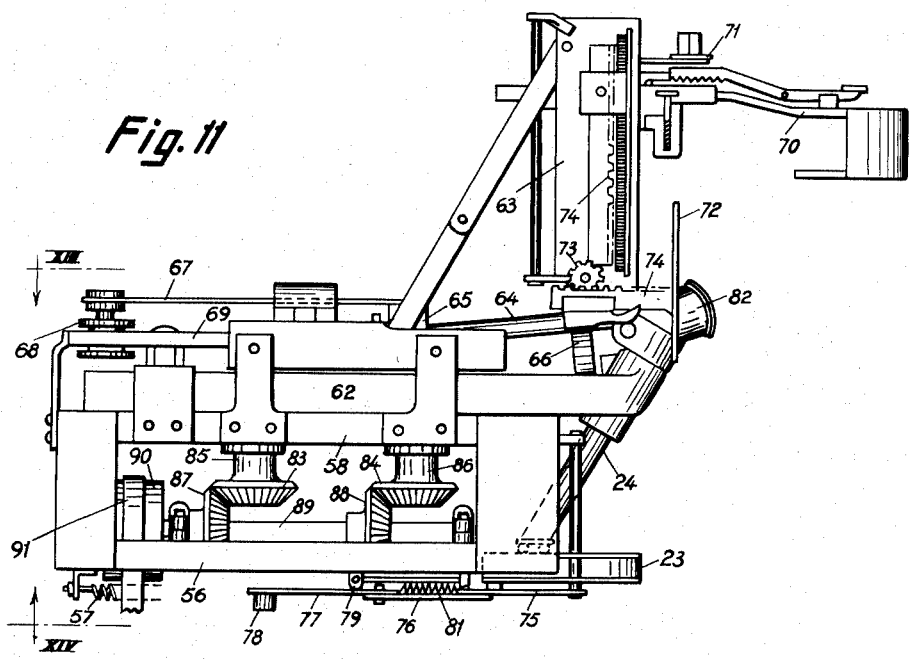

Fig. 11 indicates the side elevation of the upper part of the apparatus, viz. the rotary oscillation device.

Figure 12:
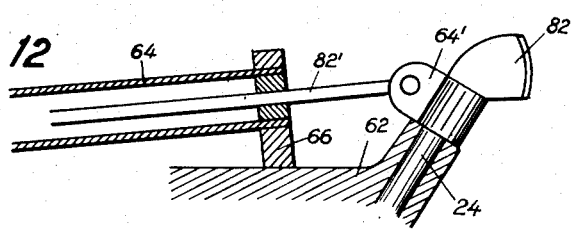

Fig. 12 is a detail of the correcting appliance represented on Fig. 11.

Fig. 13 shows in plan view the rotary suspension device, according to plane XIII of Fig. 11.

Figure 14:
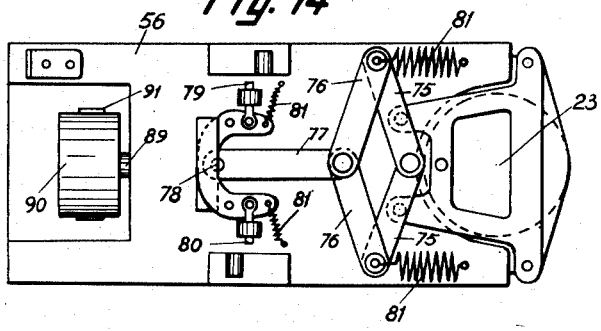

Fig. 14 indicates the said device, according to line XIV of Fig. 11.

Fig. 15 represents the side elevation of the ensemble of the apparatus.

The above indicated apparatus comprises a mechanical aggregate composed of a lower part or element constituting the general support of the mechanisms, of a frontal part serving as support of the patient, and of an upper part serving for the suspension of his body and the rotary oscillation thereof.

Figure 1:
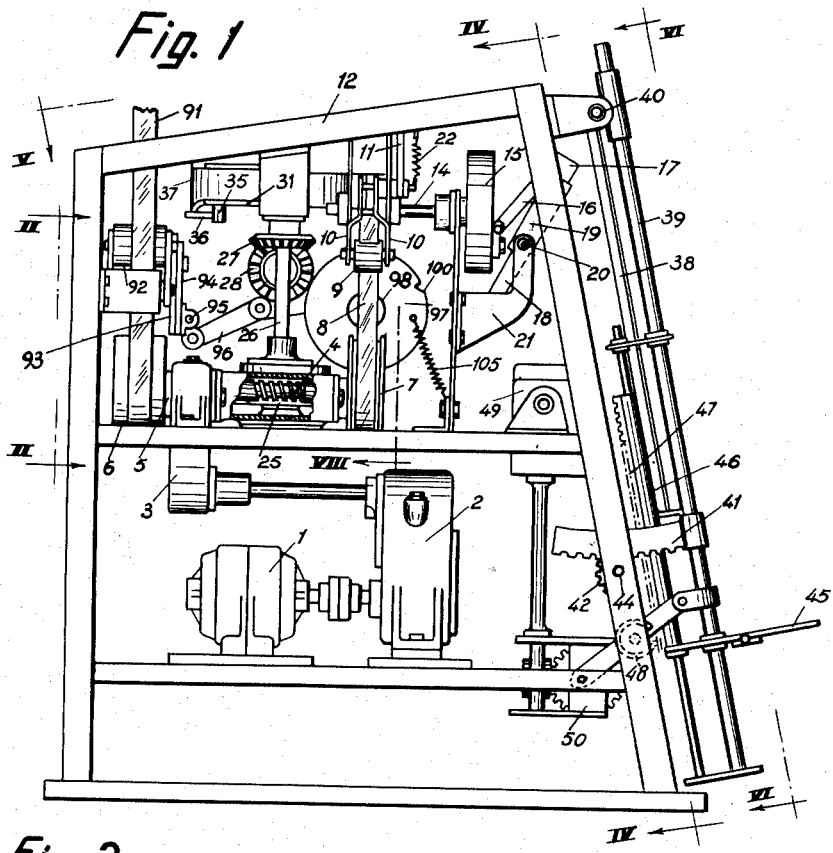

The lower part, or main element of the apparatus, is a rigid bed (Fig. 1) within which is a motor 1 provided with a speed reductor 2 and a transmission by gearings 3 serving to transmit the rotation to a spindle 4 the direction of which is preferably oriented according to the anterior-posterior line of the bed.

Of the motor movement take part two pulleys 6 and 7, one thereof anterior and posterior the other, which may receive the movement either by the intermediate of the axle 5 from the spindle 4, or directly by the transmission gearings from the speed reductor 2.

To the pulley 6, located on the rear part, is coupled the mechanism arranged in the upper zone, that is to say the whole ensemble of the upper part of the apparatus, as it will be described later on. The other pulley 7 transmits, by means of a belt 8 thereof, correlated with the tension roller 9 mounted on arms 10, pivoted to a bar 11 (Fig. 8) which projects towards the upper part or guides 12 of the element, in an intermittent manner the rotation to a pulley 13 keyed to an axle 14 where is a flywheel 15 (Fig. 1), said flywheel bearing at the front thereof an eccentric and expansive coupling, constituted by a connecting rod 16 (Figs. 1 and 4), said connecting rod being pivoted to the head 17 of a telescopic rod 18 the outer tube 19 thereof plays freely on an axle 20 arranged on a support 21 fixed to the bed of the apparatus.

In Fig. 8 is indicated the detail of the automatic tension device for the automatical starting and stopping of said mechanisms, showing in frontal view the integrant pieces thereof, which are: pulley 13, transmission belt 8, tension roller 9, rocking arms 10 for the suspension thereof, bar 11 for movement of arms 10, and antagonistic spring 22.

The relation of the upper part with the mechanical aggregate, apart from the transmission furnished by the pulley 6, is also performed by means of the movable plate 23 (Figs. 11 and 14)

which is pivoted to on the lower part thereof the movable head 17, whilst on the upper part of said plate rests the ferrule of the correcting impulsion member which actuates against the deviated vertebra, said appliance being indicated at 24 (Figs. 11 and 12) and arranged on the upper part of the apparatus, taking part of the movements of said part.

Other transmissions are performed between the described mechanisms and those of the upper part, such as that which provides the spindle 4 on the screw wheel 25 (Fig. 8) provided with a vertical axle 26 which shows the set of bevel pinions 27 and 28 (Fig. 1) from which the axle or shaft of the receiving pinion 28 protrudes towards outside and actuates a pointer 29 indicating the direction of rotation on a control disc 30 (Fig. 5). The transmitting pinion gear 27, viz. the one coupled to the axle 26 carries its shaft up to the upper part, in order to join the same in the centre of a control plate 31 which serves for the movement of the upper part of the apparatus. Said plate 31 is illustrated in Figs. 1, 4, 5, 8 and in detail in Figs. 9 and 10.

The said plate 31 is constituted, preferably, by a massive core or boss 32, surrounded by a circular channel 33, interrupted by an eccentric recess 34 which communicates with the said channel. The bottom of said recess is perforated and traversed by a rod 35 the end thereof being bent into a square 36 for the purpose of providing a guide stem running along the edge of a lining in form of a cam 37 of symmetrical irregular tracing (Fig. 10).

Said plate 31 is located between the guides 12 of the general bed, said guides having inclination with respect to the plane thereof, in ascendent ramp towards the front of the apparatus.

The casing of the bed, support of the described mechanisms, is provided at the fore part thereof with a back for the patient's body which may be given by means of said device different inclinations and heights.

The said back consists in a general support sustained on guides comprising a double back 38 (Fig. 6) the sustaining bars 39 thereof rotate around a pivot 40 (Figs. 1, 6, 7 and 11), the said bars 39 carrying means for being more or less inclined, owing to the rack sectors 41 actuated by pinions 42 which are operated from the outside of the apparatus. The control of said pinions constitutes a knob or handle 43 being fixed to the end of the shaft 44 of said pinions 42 (Fig. 4). Apart from the back 38 the back-frame bears the rest or footstep 45 which may slide along the sustaining bars 39 in virtue of a telescopic mounting arranged at 46, provided for its part with longitudinal racks 47 moved at will by the pinions 48 which take movement from a transmission aggregate 49—50 controlled by the handwheel 51 located near to the above indicated handle 43 for greater operating comfort (Figs. 4, 5 and 7).

The clamping of the back 38 in the different inclinations thereof is accomplished by a pawl or catch 52 which prevents the ratchet wheel 53, mounted on the pinions shaft 44 (Figs. 4 and 7), from retroceding.

On the lateral part of the bars 39 (Fig. 7) is provided a graduated scale 54 in the direction of the length thereof, in order to make it possible to adjust the heights of footstep 45 and, moreover, a graduated sector 55 for indicating the diverse inclinations of the ensemble.

On the general bed which is being described is mounted the upper element or part of the apparatus, said part being destined, exclusively, for the action of the mechanisms thereof upon the affected part of the patient's body, for which purpose said upper part provides the rotary suspension of said body and contributes to the impulse of reducing the luxation to be cured.

Said upper part is illustrated on Figs. 11, 12, 13 and 14, being constituted by a base 56, said base being composed of two parallel and inclined sliding members, viz. the guides 12 of the general bed, the ensemble being in a position to advance and return thereon, in forward and backward direction, in virtue of the traction of the mechanism and vice versa owing to recuperation by means of a rear spring 57.

Said base 56 and the whole ensemble sustained thereby respond to the inclination of the sliding guides 12.

On the said base 56 and at a suitable separation therefrom is a parallel platform 58 (Figs. 11 and 13) on which are practised small cavities for the rotatory discs 59, said discs being provided with the respective eccentric gudgeons 60—61 keyed to a common rod 62 of sufficient amplitude which constitutes the actual support of the body of the upper arrangement being described.

On the parallel upper platform 58 which forms body with the base 56 is a vertical frame 63, sustained by a partially rotatory axle 64 (Fig. 11) and susceptible of being lifted on account of being pivoted to the support 65 which carries the rod 62, the axle 64 thereof being oscillatory due to the presence of the circular bearing 66 which sustains the vertical frame 63 whilst the support 65 is lengthened into a guide arm 67 provided with roller 68, apt to run on the double circular guide 69 fixed to said upper platform 58.

The vertical frame 63 (Figs. 11 and 13) is endowed on the two sides thereof with racks, in order to make it possible that thereon may be displaced a horizontal frame 70, said frame having articulate and adjustable structure such as to allow the adaptation to the patient's body, above the shoulders, for the purpose of fastening his arms, said horizontal frame being provided with two articulate arms 71 for cases of cervical luxations.

The vertical frame 63 bears some small supports or backs 72, susceptible of moving to and fro at will by means of controls constituted by the pinions 73 and racks 74.

The base 56 carries on the rear side thereof (towards the lower frame of the mechanisms), an elastic parallelogram 75—76 (Fig. 14) terminated in a strut 77 at the end of which is a stub 78 such as to engage into the plate 31 according as it will be specified later on in the description of the working. Said elastic parallelogram is a position recovering element of the ensemble.

On the said rear side of the base 56 are also the lateral lock pins 79 and 80, one at each side, solicited by respective springs, the same as it occurs also with the sides of the articulate parallelogram. Said springs are denoted in a general manner at 81.

The apparatus is provided with indicators which make the operation and preparation thereof easy, said indicators being mechanical or electric, such as a disc which marks the rotation turns of the patient's body, the pilot light for indicating the direction of the rotation, a mechanical thermometer arranged such as to become applied to the zone of luxation, and any other accessory device of the kind utilized in mechanics or electricity, which may complete the indications and make the working easy.

Fig. 15 shows the apparatus in side view, being indicated therein a patient to be submitted to a treatment of dorsal luxation.

The luxation reducing appliance is illustrated on the Figs. 11 and 12 and consists in an impelling head 82 united to a rod 24, all that being sustained by the head piece of rod 62, the lower portion of the said rod 24 being arranged on the movable plate 23 (Figs. 11 and 15). Said head 82 carries a flange with direction guide 82' for the to and fro motion thereof, said guide being fitted into the inside of the axle 64 (Fig. 12).

The transmission of the movement to the rotatory discs 59 is accomplished by the intermediate of the conical pinions 83—84 arranged on the respective shafts 85 and 86 thereof which engage into the rims 87—88, keyed to the longitudinal axle 89 intermediate between the two platforms, said axle projecting towards the rear part where is provided said axle with a pulley 90 which receives the movement coming from pulley 6 (Fig. 1) by means of a belt 91.

Figure 2:
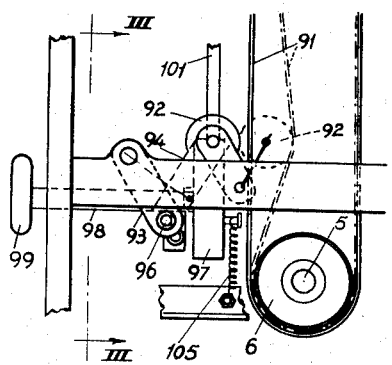
Figure 3:
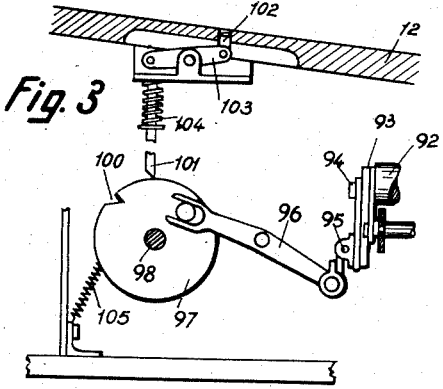

Marginally to said belt there is a tension pulley 92 (Figs. 2 and 3) which is operated by hand from the outside, stopping the conical rotation movement in the moment in which the patient's body is lifted.

The device for the operation of the tension pulley consists in a set of pivoted levers 93 and 94 on the hinged axle 95 of which actuates the rocker arm 96 having one end thereof coupled to an eccentric pin 96' arranged on the disc 97, the shaft of which ends in an outer handwheel 99. Said disc 97, operated at will from the outside, has a notch 100, in order to be clamped on being operated by means of a catch 101, and to actuate and to fix the tensor which acts upon the pulleys 6 and 90, such being established the rotatory movement. The catch 101 is connected to a member 102 lengthened such as to protrude through the top surface of the guides 12 of the upper element, by means of a rocker arm 103.

When the sliding movement of the upper element of the apparatus is initiated, the head of the lengthened member 102 is pressed down whereby the catch is lifted and ceases clamping in the displacement thereof the disc 97 which by means of a spring 104, coupled thereto and another one 105, coupled to the disc 97, returns into its original position, and the tension pulley 92 ceases working and, consequently, stops actuating upon the pulleys 6 and 90, such ceasing automatically the rotatory movement.

The working is as follows:

Assuming the apparatus to be in ensemble with the elements thereof coupled, according as it is learned from the description, the patient is placed in upright position on the footstep 45, the horizontal frame 70 being lifted in order to allow his accommodation, being successively lowered such as to detain his arms, crossed and fastened on the frame 70, the patient remaining with his arms in said position, due to the frontal expansion of the said piece.

Back and footstep are adjusted with respect to height and inclination, the position of the small supports or backs 72 being likewise modified, for the purpose that the patient's body may result in an inclined position and perfectly resting upon the backs.

The height of the patient's body and the inclination thereof will depend, of course, upon the radioscopic examination of the luxation in order that the affected part may be put in front of and resting on the impelling head 82.

In said arrangement the apparatus will have the different elements thereof in mechanical connection, and for this purpose the upper part will be connected with the lower one by the pulleys 6 and 90, and the stub 78 coupled to the circular channel 33 of the control plate 31, within which the said stub will always remain with the exception of determined instants in which it is lodged within the eccentric recess 34 of said channel. The head 82 will be in permanent contact with the vertebra to be corrected.

The treatment may be accomplished by rotation and lifting of the patient's body, or doing without said rotation, for which purpose is provided the tension pulley 92 with a set of levers actuating on the belt 91. The rotation always results oscillating from the hip on upwards, because the patient has his feet resting on the footstep.

Assuming the treatment to be accomplished with rotation and lifting, the handwheel 99 is operated so that belt 91 comes into operative engagement with pulleys 6 and 9, and in the moment in which the impulsion against the vertebra will take place, the said belt will be automatically loosened.

When the motor is started—as the tension roller 9 is inoperative—it will happen that solely the set 6—90—91 will enter into rotation revolving the discs 59 that due to the respective eccentric gudgeon thereof will urge the rod 62 to take up the alternate rotatory movement which the same imparts to the whole suspension support of the upper part.

Once said movement is initiated, the stub 78 which is in the circular channel 33 arrives at entering into the eccentric recess 34, being thereby drawn backwards, putting the recovering springs belonging to the parallelogram 75—76 under tension.

When the rocking rotation movement of the patient's body provides a certain inertia which is attained generally between the second and third turn, the stub 78 which is in the eccentric recess 34, on putting the whole mechanism of the aforesaid parallelogram under tension, urges the upper aggregate to slide backwards on the guides 12. The displacement towards the rear occasions that the head of the bar 11 is pressed down traversing said guides and as the tension roller 9 is actuated in consequence thereof, automatically begins the rotation of the axle 14 and wheel 15 in virtue of which the head 17, pivoted to the movable plate 23 which accompanied the latter in the whole backwards displacement, is lifted owing to the telescopic mounting thereof and due to the eccentricity of the plate 23 and, in consequence thereof, to the rotating ferrule of rod 24, holder of the reducing head 82 which is suitably extended by means of the flange and guide on rod 64 which in no moment lost contact with the body of the patient.

The lifting of the movable plate 23 involves the raising of the vertical frame 63 owing to the articulate play of the base thereof, and the body of the patient, sustained by the horizontal frame 70, consequently, is also lifted in the suitable moment in which actuates the head 82 which applies the reducing impulsion to the vertebra, said impulsion thus being performed when the body is suspended and with the vertebral column propitiously prepared due to the initiated rotation.

After the reducing impulsion the elastic parallelogram 75—76 recovers its position owing to the continuity of the course of the eccentric recess 34, said recess on arriving at the most backward position thereof actuating the contour cam 37 in order to withdraw the rod 35 which retained the stub 78, the parallelogram remaining free and recovering the position of rest thereof.

The whole upper aggregate would be left arrested in said position, if there were not the recovering spring 57 on the rear part thereof which comes to aid the natural tendency of the patient's body which will bend forward, viz into the original position at the beginning of the movement. It is deduced that the whole upper element will advance on the guides into the original position thereof.

So, the suspension movement of the patient's body is performed in full rotation, a circumstance requisite in order that the treatment may yield a technically perfect result.

The described apparatus comprises the necessary mechanisms for a totally automatic working thereof. It is possible to do without some of said mechanisms, in order to simplify the mechanical structure of the same, replacing the working of part of the mechanisms thereof in such case by the manual handling by the operator himself. For the reasons expressed the apparatus, performing the same working, may be of a more elemental structure on base of an automatic part and a part operated by hand within the basic principle of rotation, suspension, and impulsion action upon the vertebra, for which method the same has been expressly conceived.

Having now described and ascertained the nature of my said invention and in what manner the same is to be performed, I declare that what I claim as new and desire to secure by Letters Patent is:

1. An automatically operating electromechanical apparatus for the reduction of vertebral luxations and subluxations comprising a lower element, a general supporting back for a patient at the front side of the apparatus, said supporting back being connected to said lower element in an inclinable relationship, a rest longitudinally slidable on said back, an upper element longitudinally displaceable with respect to said lower element, elastic means biasing the upper element to its forward position and respectively to the lower element, a traction and release device for driving the upper element backwards and to release the same to allow the return thereof to said forward position, an upper ensemble operatively connected to said upper element for combined lateral and longitudinal reciprocating movements to rotate the ends thereof about an upright axis, and for oscillation about a longitudinal axis and for elevation, said upper ensemble including a luxation reducing appliance comprising a reducing head which protrudes from the front side of the apparatus, a supporting frame, a box vertically slideable thereon and adapted to support a patient standing on said rest and leaning against said back by clamping of the patient's arms in cross position and a longitudinally slidable support for the patient's back, the apparatus further comprising setting means for adjusting the back inclination, rest height and back support position to place the patient under treatment in an initial position with his affected vertebra leaning against said reducing head, operating means to rotate said upper ensemble and automatic control devices for allowing said rotation only at given positions of the upper element with respect to the lower element, so that upon rotation of that upper ensemble the patient's shoulders are rotated about an upright axis, while the patient's feet are standing on said rest, lifting means for said upper ensemble and reducing head, and drive and control means to operate the above elements in a given sequence.

2. An apparatus as in claim 1 wherein said traction and release device, includes a driving axle in said lower element, a control plate connected thereto for rotation, a concentrical groove in the upper face of said plate, a stub engaged with said groove, said stub being resiliently connected with the upper element, a recess in the upper face of said plate and opening towards said groove, said recess being adapted to house said stub, and means selectively allowing engagement of said stub with said recess to drive back the upper element and disengagement of said stub for return of the upper element to the initial position thereof.

3. An apparatus as in claim 1 wherein said means for rotating the upper ensemble, includes a driving shaft and an actuated shaft, a number of discs journaled for rotation in said upper element, means operatively connecting said discs with the actuated shaft, said discs including eccentric gudgeons, a rod connecting said gudgeons and an end thereof extruding towards the front side of the apparatus, said rod serving as a supporting means for the upper ensemble, and transmission means operatively connecting both said driving and actuated shafts and including coupling means adapted to discontinue the operation of said actuated shaft by the transmission means when the upper element comes to the back position thereof.

4. An apparatus as in claim 1 wherein said lifting means includes an inclined bearing in said rod end which extends forwardly of the apparatus, a rod slideably mounted thereto, the upper end of said rod having fixed thereon said luxation reducing head, said upper end having also connected thereto the upper ensemble, and means for imparting said rod a sudden lifting movement during the backwards stroke of the upper element.

MIGUEL LLONGUERAS TORRAS.

References Cited in the file of this patent
UNITED STATES PATENTS

| Number | Name | Date |
|---|---|---|
| 1,617,593 | Hardy | Feb. 15, 1927 |
| 1,950,948 | Murray | Mar. 13, 1934 |
| 2,035,869 | Denison | Mar. 31, 1936 |